UNITED STATES PATENT OFFICE.

WILLIAM ARMISTEAD GAYLE, OF MONTGOMERY, ALABAMA.

COMPOUND FOR PRESERVING WOOD, &c.

SPECIFICATION forming part of Letters Patent No. 497,471, dated May 16, 1893.

Application filed June 28, 1892. Serial No. 438,244. (No specimens.)

*To all whom it may concern:*

Be it known that I, WILLIAM ARMISTEAD GAYLE, a citizen of the United States, residing at Montgomery, in the county of Montgomery and State of Alabama, have invented a new and useful Composition of Matter for Preserving Vegetable Fiber, of which the following is a clear, full, and exact description.

I mix together about equal parts of common ground ocher, and crude cotton-seed oil, while at about the same temperature as the atmosphere, thus producing a liquid about the consistency of good house-paint. To this liquid may be added with advantage about one-sixteenth of its weight, in common resin. The compound should be gently heated, being well stirred during the heating process as the heating is only for the purpose of liquefying the resin.

This composition is best applied to articles made of vegetable fiber by immersing them in it. Bags and similar articles should first be turned wrong side out, and then be immersed. Any excess or surplus liquid should be removed from the bags by wringing.

The composition of matter may be employed for the protection of wood submerged in either fresh or salt water by immersing the wood in the composition, or applying the composition with an ordinary paint brush. By treating vegetable fiber with this compound each fiber becomes thoroughly coated, thereby rendering it impervious to the action of water, air and acid.

The chemical effect in my new composition is produced by the grease in the fluid, neutralizing the acid which comes in actual contact with the fiber, so coated by the fluid; the known affinity of acid for water, induces the acid to penetrate any fiber which has absorbed water, either from contact with the damp ground, or rain to which the articles may have been exposed. Wood is preserved by this composition, as the wood coated with fluid is thoroughly insulated and thereby protected from the action of salt or fresh water, as well as from the action of the air. The resin gives greater body and adhesiveness to the fluid, and further renders the wood thus coated most distasteful to destructive insects, and prevents them attaching themselves to the wood and from destroying it.

I am aware that it is not new to incorporate ocher with vegetable oils, including cotton seed oil, but this mixture without the resin would be unsuitable for my purpose, as the wood, such as piles, &c., needs this addition to thoroughly keep it from attack by destructive insects.

Having thus described my invention, what I claim as new, and desire to secure by Letters Patent, is—

The composition of matter for preserving vegetable fiber consisting of ground ocher, cotton seed oil and liquefied resin mixed in substantially the proportions stated.

WILLIAM ARMISTEAD GAYLE.

Witnesses:
PAUL T. SAYRE,
GEO. R. BOYD.